United States Patent
Böer et al.

(10) Patent No.: US 6,355,358 B1
(45) Date of Patent: Mar. 12, 2002

(54) MULTILAYER COMPOSITE

(75) Inventors: Michael Böer, Olfen; Guido Schmitz; Georg Oenbrink, both of Dülmen; Harald Häger, Marl; Ralf Richter, Recklinghausen, all of (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 09/605,363

(22) Filed: Jun. 29, 2000

(30) Foreign Application Priority Data

Jun. 29, 1999 (DE) ......................................... 199 29 883
Feb. 9, 2000 (DE) ......................................... 100 05 641

(51) Int. Cl.$^7$ ........................... B32B 7/02; B32B 27/34; C08L 77/00; C08G 69/48; C08G 73/02
(52) U.S. Cl. .................. 428/474.4; 428/34.1; 428/34.7; 428/36.9; 428/36.91; 428/411.1; 428/475.2; 428/480; 525/420; 156/325; 156/326; 156/327; 264/176.1; 264/506; 264/508; 264/510; 264/512
(58) Field of Search ........................... 428/475.2, 411.1, 428/36.91, 474.4, 36.9, 34.1, 34.6, 34.7; 264/508, 506, 510, 512, 176.1; 525/420; 156/325, 326, 327

(56) References Cited

U.S. PATENT DOCUMENTS

| 5,258,213 | A |   | 11/1993 | Mügge et al. ............ 428/36.91 |
| 5,362,570 | A | * | 11/1994 | Röber et al. ............. 428/36.91 |
| 5,389,410 | A | * | 2/1995  | Mügge et al. ............. 428/34.1 |
| 5,460,771 | A | * | 10/1995 | Mitchell et al. ............ 264/508 |
| 5,804,670 | A | * | 9/1998  | Stoeppelmann ............. 525/420 |
| 5,850,855 | A | * | 12/1998 | Kerschbaumer et al. .... 138/137 |
| 5,869,190 | A | * | 2/1999  | Stoeppelmann .......... 428/474.4 |
| 5,932,686 | A |   | 8/1999  | Hoff ............................ 528/288 |
| 5,952,438 | A |   | 9/1999  | Kratz et al. ................. 525/471 |
| 5,959,069 | A |   | 9/1999  | Glück et al. ................ 528/332 |

FOREIGN PATENT DOCUMENTS

| DE | 3827 092 |   | 9/1989  |
| DE | 196 33 133 |   | 3/1998  |
| DE | 196 54 058 |   | 6/1998  |
| DE | 196 54 179 |   | 6/1998  |
| EP | 0336 806 |   | 10/1989 |
| EP | 0 509 211 |   | 10/1992 |
| EP | 0 837 088 |   | 4/1998  |
| EP | 1065048 A | * | 1/2001  |

OTHER PUBLICATIONS

Synthesis and Properties of Star–Branched Nylon 6; J. Warakomski; *Chem. Mater.* 1992, 4, pp. 1000–1004.

* cited by examiner

*Primary Examiner*—P. Hampton-Hightower
(74) *Attorney, Agent, or Firm*—Oblon, Spivak, McClelland, Maier & Neustadt, P.C.

(57) ABSTRACT

A thermoplastic multilayer composite, and articles made therefrom, which has at least one layer I of a thermoplastic molding composition, at least one layer II of a further thermoplastic molding composition, bonded together with at least one layer of an adhesion promoter disposed between at least one layer I and at least one layer II. The adhesion promoter is at least 5% by weight of a graft copolymer prepared from 0.5 to 25% by weight, based on the total amount of graft copolymer, of a polyamine having at least 4 nitrogen atoms and having a number average molecular weight $M_n$ of at least 146 g/mol, and polyamide-forming monomers selected from lactams, ω-aminocarboxylic acids, equimolar mixtures of diamines and dicarboxylic acids, and their mixtures.

31 Claims, No Drawings

MULTILAYER COMPOSITE

BACKGROUND OF THE INVENTION

Field of the Invention

The invention relates to an adhesion promoter for a multilayer composite, and to a multilayer composite which contains this adhesion promoter.

Individual polymers such as polyamides or polyesters are unsuitable for many applications. For example, polyamides are not resistant to weathering since they age upon exposure to the UV radiation from sunlight, extremes of heat and cold, and can absorb atmospheric moisture. This results in discoloration, impairment of the mechanical properties and warping phenomena. In addition, although polyamides have good mechanical properties, particularly good toughness, they provide a poor barrier to the diffusion of molecules: polar substances in particular can easily diffuse through polyamides. Thus, polyamides are unsuitable for use in fuel lines in which alcohol-containing fuel is conveyed, because the alcohol component of the fuel can easily diffuse through the polyamide.

Polyesters generally have good weathering resistance and provide an excellent barrier to the diffusion of both polar and non-polar molecules. However, polyesters are generally impact-sensitive; the notched impact strength of polyesters in particular is frequently inadequate for many applications. Polyesters therefore cannot be used by themselves in many applications in which their other properties, such as their excellent barrier properties, high heat resistance and good rigidity, would be desired.

Similarly, other polymers also exhibit a mix of desirable and undesirable properties such as those described for polyamides and polyesters, and are consequently unsuitable for many applications.

If various polymers could be strongly bonded into laminated articles, it would be possible to combine the complementary properties of various polymers in order to form articles which exhibit some of the best properties of each of the polymer employed. For example, it may be possible to protect polyamide moldings against light and humidity (i.e., weathering) by coating them with a polyester. Similarly, polyester moldings could be weathering) by coating them with a polyester. Similarly, polyester moldings could be protected against chemical and mechanical attack by coating them with a polyamide. Thus, if different polymers could be strongly bonded together, it would be possible to provide articles such as fuel lines, which usually consist of a polyamide (PA), such as PA 6, PA 11 or PA 12 (i.e., poly(ω-aminocaproic acid), poly(ω-amino-undecanoic acid), poly(ω-amino-dodecanoic acid), respectively), with a barrier layer to fuel, in particular to alcohol-containing fuel. In addition, such laminates comprising various layers of different polymers having different functions are more suitable than monolayers for food packaging.

Composites of polyamides and polyesters are already known in principle. EP-A-0 336 806 describes the coextrusion of PA 12 and polybutylene terephthalate (PBT) to give a two-layer pipe. German Patent 38 27 092 describes a multilayer pipe which has, from the inside outward, layers of polyamide, polyvinyl alcohol, polyamide and polyester. However, it is well known that the majority of polymers, including polyamides and polyesters, are incompatible with one another, which is why adhesion is poor between the laminate layers of polymer laminates. However, a strong bond between the individual polymer layers is absolutely necessary in conventional industrial applications.

DE-A 196 33 133 describes a multilayer pipe comprising at least two layers bonded well to one another, where the first layer is a barrier layer and the thermoplastic of the second layer has been treated with polyethyleneimine as adhesion promoter. However, when this process was repeated, the desired bonding did not occur.

A typical approach to bonding, for example polyester and polyamide layers, would be to use an adhesion promoter consisting of a mixture of polyamide and polyester. However, blends of this type, which are usually prepared by mixing the melts in an extruder, are very brittle. Corresponding coextrusion experiments in which the polyamide and polyester are bonded with such polyamide/polyester blend adhesion promoters either exhibit adhesion of the adhesion promoter to the polyamide or to the polyester, but never to both of the two polymers simultaneously.

EP-A-0 509 211 describes thermoplastic multilayer composites in which a layer of a polyamide molding composition and a layer of a polyester molding composition are bonded by means of an adhesion promoter which comprises a mixture of polyamide and polyester. Since the problems discussed above occur here, in a preferred embodiment at least part of the polyamide content and of the polyester content in the adhesion promoter are in the form of a polyamide-polyester block copolymer. However, the preparation of polyamide-polyester block copolymers of this type is not easy and requires the addition of auxiliaries or catalysts. Furthermore, because the block copolymers are prepared by linking suitable end groups of polyamide and/or polyester polymers, precise control of the end groups is necessary in order to ensure that the appropriate end groups are present in sufficient concentration. Since commercial grades of polyamide or polyester polymers do not meet these requirements, specialty grades of these polymers must be prepared and subsequently converted into a block copolymer. The production of adhesion promoters of this type therefore requires considerable effort. This is more particularly true of the block copolyester-amides employed in the process of EP-A-0 837 088 as adhesion promoters in polyamide-polyester multilayer composites.

Composites comprising other materials are also known, but due to the abovementioned incompatibility of most polymer materials, similar types of individually matched adhesion promoters are usually required.

SUMMARY OF THE INVENTION

The object of the present invention is to provide an inexpensive, easy-to-prepare, but nonetheless effective adhesion promoter for a multilayer composite. In a multilayer composite of this type, the layer adhesion should be maintained for a long time, even in contact with reagents such as, for example, fuel, solvents, oil or greases and at elevated temperatures.

This object has been achieved by a thermoplastic multilayer composite comprising at least one layer I of a thermoplastic molding composition, at least one layer II of a further thermoplastic molding composition and, in between layer I and layer II, a layer of an adhesion promoter which comprises at least 5% by weight, preferably at least 10% by weight and particularly preferably at least 20% by weight of a graft copolymer prepared using the following monomers:

a) from 0.5 to 25% by weight, preferably from 1 to 20% by weight and particularly preferably from 1.5 to 16% by weight, based on the graft copolymer, of a polyamine having at least 4, preferably at least 8 and particularly preferably at least 11 nitrogen atoms and having a number average molecular weight $M_n$ of at least 146 g/mol, preferably of at least 500 g/mol and particularly preferably of at least 800 g/mol, and b) polyamide-forming monomers selected from lactams, ω-aminocarboxylic acids and/or equimolar combinations of diamine and dicarboxylic acid.

DETAILED DESCRIPTION OF THE INVENTION

The polyamine component of the graft copolymer can be, for example, the following classes of polyamines:

polyvinylamines (Römpp Chemie Lexikon {Römpp's Lexicon of Chemistry}, 9th Edition, Volume 6, page 4921, Georg Thieme Verlag, Stuttgart, 1992);

polyamines prepared from alternating polyketones (DE-A 196 54 058);

dendrimers, such as, for example, ((H$_2$N—(CH$_2$)$_3$)$_2$N—(CH$_2$)$_3$)$_2$—N(CH$_2$)$_2$—N((CH$_2$)$_2$—N((CH$_2$)$_3$—NH$_2$)$_2$)$_2$ (DE-A-196 54 179) or tris(2-aminoethyl)amine, N,N-bis(2-aminoethyl)-N',N'-bis{2-{bis(2-aminoethyl)amino}ethyl}-1,2-ethanediamine or 3,15-bis(2-aminoethyl)-6,12-bis{2-{bis(2-aminoethyl)amino}ethyl}-9-{2-{bis{2-bis(2-aminoethyl)amino}ethyl}amino}ethyl}-3,6,9,12,15-pentaazaheptadecane-1,17-diamine (J. M. Warakomski, Chem. Mat. 1992, 4, 1000–1004);

linear polyethyleneimines, which can be prepared by polymerization of 4,5-dihydro-1,3-oxazoles followed by hydrolysis (Houben-Weyl, Methoden der Organischen Chemie {Methods of Organic Chemistry}, Volume E20, pages 1482–1487, Georg Thieme Verlag, Stuttgart, 1987);

branched polyethyleneimines, which are obtainable by polymerization of aziridines (Houben-Weyl, Methoden der Organischen Chemie {Methods of Organic Chemistry}, Volume E20, pages 1482–1487, Georg Thieme Verlag, Stuttgart, 1987) and which generally have the following amino group distribution: from 25 to 46% of primary amino groups, from 30 to 45% of secondary amino groups and from 16 to 40% of tertiary amino groups.

In the preferred case, the polyamine has a number average molecular weight $M_n$ of at most 20,000 g/mol, particularly preferably of at most 10,000 g/mol and especially preferably of at most 5000 g/mol.

Lactams and ω-aminocarboxylic acids which are employed as polyamide forming monomers contain from 4 to 19 and in particular from 6 to 12 carbon atoms. In addition, the number of carbon atoms of the polyamide forming monomers may be 5, 6, 7, 8, 9, 10, 11, 12, 13, 14, 15, 16, 17, and 18 carbon atoms, inclusive of all subranges therebetween. Particular preference is given to ε-caprolactam, ε-aminocaproic acid, caprylolactam, ω-aminocaprylic acid, laurolactam, ω-aminododecanoic acid and/or ω-aminoundecanoic acid.

Combinations of diamine and dicarboxylic acid are, for example, hexamethylenediamine/adipic acid, hexamethylenediamine/dodecanedioic acid, octamethylenediamine/sebacic acid, decamethylenediamine/sebacic acid, decamethylenediamine/dodecanedioic acid, dodecamethylenediamine/dodecanedioic acid and dodecamethylenediamine/2,6-naphthalenedicarboxylic acid. In addition, however, it is also possible to employ all other combinations, such as decamethylenediamine/dodecanedioic acid/terephthalic acid, hexamethylenediamine/adipic acid/terephthalic acid, hexamethylenediamine/adipic acid/caprolactam, decamethylenediamine/dodecanedioic acid/ω-aminoundecanoic acid, decamethylenediamine/dodecanedioic acid/laurolactam, decamethylenediamine/terephthalic acid/laurolactam or dodecamethylenediamine/2,6-naphthalenedicarboxylic acid/laurolactam.

In a preferred embodiment, the graft copolymer is prepared with the additional use of an oligocarboxylic acid selected from 0.015 to about 3 mol % of dicarboxylic acid and/or 0.01 to about 1.2 mol % of tricarboxylic acid, in each case based on the sum of the moles of the polyamide-forming monomers. In this connection, each monomer in the equivalent combination of diamine and dicarboxylic acid is considered individually. If a dicarboxylic acid is used, preferably from 0.03 to 2.2 mol %, particularly preferably from 0.05 to 1.5 mol %, very particularly preferably from 0.1 to 1 mol % and in particular from 0.15 to 0.65 mol % is added. If a tricarboxylic acid is used, preferably from 0.02 to 0.9 mol %, particularly preferably from 0.025 to 0.6 mol %, very particularly preferably from 0.03 to 0.4 mol % and in particular from 0.04 to 0.25 mol % is used. The concomitant use of the oligocarboxylic acid significantly improves the solvent and fuel resistance, in particular the hydrolysis and alcoholysis resistance and the stress cracking resistance, but also the swelling behavior and consequently the dimensional stability, as well as the diffusion barrier action.

The oligocarboxylic acid employed can be any desired di- or tricarboxylic acid having 6 to 24 carbon atoms, for example adipic acid, suberic acid, azelaic acid, sebacic acid, dodecanedioic acid, isophthalic acid, 2,6-naphthalenedicarboxylic acid, cyclohexane-1,4-dicarboxylic acid, trimesic acid and/or trimellitic acid. In addition the oligocarboxylic acid can have 6, 7, 8, 9, 10, 11, 12, 13, 14, 15, 16, 17, 18, 19, 20, 21, 22, or 23 carbon atoms, inclusive of all subranges therebetween.

If desired, aliphatic, alicyclic, aromatic, aralkyl and/or alkylaryl-substituted monocarboxylic acids having 3 to 50 carbon atoms, such as, for example, lauric acid, unsaturated fatty acids, acrylic acid or benzoic acid, can be employed as a regulator. By means of these regulators, the concentration of amino groups can be reduced without changing the shape of the molecule. In addition, functional groups, such as those containing double or triple bonds, etc., can be introduced in this way. However, it is desired that the graft copolymer has a substantial content of amino groups. The amino group concentration of the graft copolymer is preferably in the range from 150 to 1500 mmol/kg, particularly preferably in the range from 250 to 1300 mmol/kg and very particularly preferably in the range from 300 to 1100 mmol/kg. Here and below, the term "amino groups" is taken to mean not only amino end groups, but also any secondary or tertiary amine groups which may be present in the polyamine.

In a preferred embodiment, the amino group concentration of the graft copolymer is in the range from 100 to 2500 mmol/kg, including 200, 300, 400, 500, 600, 700, 800, 900, 1000, 1100, 1200, 1300, 1400, 1500, 1600, 1700, 1800, 1900, 2000, 2100, 2200, 2300, and 2400 mmol/kg, inclusive of all values and subranges therebetween.

The graft copolymers according to the invention can be prepared by various processes. One method is to initially introduce the lactam or ω-aminocarboxylic acid and polyamine together and to carry out the polymerization or polycondensation. The oligocarboxylic acid can be added either at the beginning or during the reaction.

However, a preferred process comprises, in a two-step process, first carrying out the lactam cleavage and prepolymerization in the presence of water (alternatively, the corresponding ω-aminocarboxylic acids or diamines and dicarboxylic acids are employed and prepolymerized directly). Second, the polyamine is added, while any oligocarboxylic acid used concomitantly is metered in before, during or after the prepolymerization. The mixture is then polycondensed at temperatures of from 200 to 290° C. in a stream of nitrogen or under reduced pressure.

A further preferred process comprises the hydrolytic degradation of a polyamide to a prepolymer and the simultaneous or subsequent reaction with the polyamine. Preference is given to polyamides in which the end group difference is approximately zero or in which any oligocarboxylic acid used concomitantly has already been copolycondensed. However, the oligocarboxylic acid can also be added at the beginning or during the degradation reaction.

These processes allow the preparation of ultra-highly branched polyamides having acid numbers of less than 40 mmol/kg, preferably less than 20 mmol/kg and particularly preferably less than 10 mmol/kg. After a reaction time of only from one to five hours at temperatures of from 200° C. to 290° C., approximately complete conversion is achieved.

If desired, the above ultra-highly branched polyamides may be treated for a period of hours under vacuum. This vacuum treatment lasts at least four hours, preferably at least six hours and particularly preferably at least eight hours at from 200 to 290° C. After an induction period of several hours, an increase in the melt viscosity is then observed, which is probably due to the reaction of amino end groups with one another, together with elimination of ammonia and chain extension and/or cross-linking. This further increases the molecular weight, which is particularly advantageous for extrusion molding compositions. Alternatively, the ultra-highly branched polyamide can also be post-condensed as a solid rather than a melt.

By means of the above-described adhesion promoter, a multiplicity of polymers or molding compositions based thereon can be bonded to one another. In general, suitable polymers are all those which, owing to structural similarities, are physically compatible with the graft copolymer of this invention, such as, for example, polyamides. Equally suitable are all polymers which undergo some sort of chemical linking reaction, for example, polymers which chemically react with or at least form hydrogen bonds with the amino groups of the graft copolymer, such as, for example, polyesters.

Embodiments according to the invention are, for example:
 A multilayer composite which comprises layers of different polyamide molding compositions which are of low compatibility or are incompatible with one another and which are bonded by means of the adhesion promoter according to the invention.
 A multilayer composite which comprises layers of different polyester molding compositions which are incompatible with one another and are bonded by the adhesion promoter according to the invention
 A multilayer composite which comprises a layer of a polyamide molding composition which is bonded, by means of the adhesion promoter according to the invention, to a layer of another molding composition which is based on a polymer which is not a polyamide.
 A multilayer composite which comprises a layer of a polyester molding composition which is bonded, by means of the adhesion promoter according to the invention, to a layer of another molding composition which is based on a polymer which is not a polyester.
 A multilayer composite which comprises the following layers:

I. A layer I of a polyamide molding composition;
II. A layer II of a polyester molding composition; and between layer I and layer II, a layer of the adhesion promoter according to the invention.

Suitable polyamides are primarily aliphatic homo- and copolycondensates, for example PA 46, PA 66, PA 68, PA 612, PA 88, PA 810, PA 1010, PA 1012, PA 1212, PA 6, PA 7, PA 8, PA 9, PA 10, PA 11 and PA 12. (The notation of the polyamides corresponds to the international standard, where the first number(s) indicates the number of carbon atoms in the starting diamine and the final number(s) denotes the number of carbon atoms in the dicarboxylic acid. If only one number is given, this means that the starting material was an α, ω-aminocarboxylic acid or the lactam derived therefrom; for more information, see H. Domininghaus, Die Kunststoffe und ihre Eigenschaften {The Plastics and Their Properties}, pages 272 ff., VDI-Verlag, 1976.)

If copolyamides are used, these can contain, for example, adipic acid, sebacic acid, suberic acid, isophthalic acid, terephthalic acid, naphthalene-2,6-dicarboxylic acid, etc., as co-acid or bis(4-aminocyclohexyl)methane, trimethylhexamethylenediamine, hexamethylenediamine or the like as co-diamine. Lactams, such as caprolactam or laurolactam, or aminocarboxylic acids, such as ω-aminoundecanoic acid, can likewise be incorporated as co-components. The preparation of these polyamides is known (for example D. B. Jacobs, J. Zimmermann, Polymerization Processes, pp. 424–467, Interscience Publishers, New York, 1977; DE-B 21 52 194).

In addition, suitable polyamides are also mixed aliphatic/aromatic polycondensates, as described, for example, in U.S. Pat. Nos. 2,071,250, 2,071,251, 2,130,523, 2,130,948, 2,241,322, 2,312,966, 2,512,606 and 3,393,210, and in Kirk-Othmer, Encyclopedia of Chemical Technology, 3rd Ed., Vol. 18, pages 328 ff. and 435 ff., Wiley & Sons, 1982. Other suitable polyamides are poly(ether-ester-amides) and poly(ether-amides); products of this type are described, for example, in DE-A 25 23 991, 27 12 987 and 30 06 961.

The polyamide molding composition can comprise either one of these polyamides or a plurality of polyamides in the form of a mixture. Furthermore, up to 40% by weight of other thermoplastics may be present so long as they do not adversely affect the bonding ability; in particular impact-modifying rubbers, such as ethylene-propylene or ethylene-propylene-diene copolymers (EPA-0 295 076), polypentenylene, polyoctenylene, random or block copolymers of alkenyl-aromatic compounds with aliphatic olefins or dienes (EP-A-0261 748) or core/shell rubbers having a tough, elastic core of (meth)acrylate, butadiene or styrenebutadiene rubber having glass transition temperatures ($T_g$) of <−10° C., where the core may be crosslinked and the shell may be built up from styrene and/or methyl methacrylate and/or further unsaturated monomers (DE-A 21 44 528 and 37 28 685).

The conventional auxiliaries and additives for polyamides, such as, for example, flame retardants, stabilizers, plasticizers, processing auxiliaries, fillers, in particular fillers which improve the electrical conductivity, reinforcing fibers, pigments or the like, can be added to the polyamide molding composition. The amount of said agents should be metered in such a way that the desired properties are not seriously impaired.

Suitable polyesters are thermoplastic polyesters having a linear structure. These are prepared by polycondensation of diols with dicarboxylic acid or polyester-forming derivatives thereof, such as dimethyl esters. Suitable diols have the formula HO—R—OH, where R is a divalent, branched or unbranched, aliphatic and/or cycloaliphatic radical having 2 to 40, preferably 2 to 12, carbon atoms. Suitable dicarboxylic acids have the formula HOOC—R'—COOH, where R' is a divalent aromatic radical having 6 to 20, preferably 6 to 12, carbon atoms.

Examples of diols which may be employed are ethylene glycol, trimethylene glycol, tetramethylene glycol, hexamethylene glycol, neopentyl glycol, cyclohexanedimethanol and the $C_{36}$-diol dimer diol. The diols can be employed alone or as a diol mixture.

Up to 25 mol % of said diol may be replaced by a polyalkylene glycol having the following general formula:

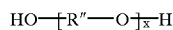

where R" is a divalent radical having 2 to 4 carbon atoms, and x can adopt a value of from 2 to 50.

Examples of suitable aromatic dicarboxylic acids are terephthalic acid, isophthalic acid, 1,4-, 1,5-, 2,6- and 2,7-naphthalenedicarboxylic acid, diphenic acid and 4,4'-oxybis (benzoic acid). Up to 30 mol % of these dicarboxylic acids may be replaced by aliphatic or cycloaliphatic dicarboxylic acids, for example succinic acid, adipic acid, sebacic acid, dodecanedioic acid or cyclohexane-1,4-dicarboxylic acid.

Examples of suitable polyesters are polyethylene terephthalate, polypropylene terephthalate, polybutylene terephthalate, polyethylene 2,6-naphthalate, polypropylene 2,6-naphthalate and polybutylene 2,6-naphthalate.

The preparation of these polyesters is known (DE-A 24 07 155 and 24 07 156; Ullmanns Encyclopadie der technischen Chemie {Ullmann's Encyclopedia of Industrial Chemistry}, 4th Ed., Vol. 19, pages 65 ff., Verlag Chemie, Weinheim, 1980).

The polyester molding composition may comprise any one of these polyesters or a plurality of polyesters in the form of a mixture. Furthermore, up to 40% by weight of other thermoplastics may be present so long as they do not adversely affect the bonding ability, in particular impact-modifying rubbers, as already indicated above for the polyamide. Furthermore, the polyester molding composition may comprise the conventional auxiliaries and additives for polyesters, such as, for example, flame retardants, stabilizers, processing auxiliaries, fillers, in particular for improving the electrical conductivity, reinforcing fibers, pigments or the like. The amount of said agents should be metered in such a way that the desired properties are not seriously impaired.

In general, the polyamide molding composition has a continuous polyamide phase and the polyester molding composition has a continuous polyester phase.

If the composite contains a layer of a polyamide molding composition, the adhesion promoter, in a preferred embodiment, comprises a polyamide in addition to the graft copolymer, particularly preferably in an amount of from 10 to 90% by weight, including 20, 30, 40, 50, 60, 70, and 80% by weight, inclusive of all values and subranges therebetween, based on the sum of graft copolymer and polyamide.

If the composite contains a layer of a polyester molding composition, the adhesion promoter, in a further preferred embodiment, comprises a polyester in addition to the graft copolymer, particularly preferably from 10 to 90% by weight, including 20, 30, 40, 50, 60, 70, and 80% by weight, inclusive of all values and subranges therebetween, based on the sum of graft copolymer and polyester.

If the composite contains a layer I of a polyamide molding composition and a layer II of a polyester molding composition which are bonded to one another by the adhesion promoter according to the invention, it is preferred that the adhesion promoter comprises both a polyamide and a polyester in addition to the graft copolymer. Corresponding molding compositions are likewise a subject matter of the invention.

In this embodiment, the adhesion promoter preferably comprises the following composition:

I. from 5 to 60 parts by weight of a graft copolymer prepared using the following monomers:
  a) from 0.5 to 25% by weight, based on the graft polymer, of a polyamine having at least 4, preferably at least 8 and particularly preferably at least 11 nitrogen atoms and having a number average molecular weight $M_n$ of at least 146 g/mol, preferably of at least 500 g/mol and particularly preferably of at least 800 g/mol, and
  b) polyamide-forming monomers selected from lactams, ω-aminocarboxylic acids and/or equimolar combinations of diamine and dicarboxylic acid;
II. from 10 to 85 parts by weight of a polyamide;
III. from 10 to 85 parts by weight of a polyester; where the sum of the parts by weight of I, II and III is 100; and
IV. a maximum of 40 parts by weight of additives selected from impact-modifying rubber and/or conventional auxiliaries or added materials.

The polyamide component II of the adhesion promoter should be readily compatible with the polyamide of layer I and thus should additionally facilitate good adhesion. Suitable polyamide combinations are known to the person skilled in the art or can easily be determined by simple routine experiments, for example by means of pressed plates. It is frequently sufficient for the two polyamides to have at least one monomer unit in common or for the two to have a monomer unit corresponding to one another with the same number of carbon atoms or with the same length. Ideally, the polyamide should substantially correspond to the polyamide of layer I.

The same applies to the polyester component III of the adhesion promoter, which should be readily compatible with the polyester of layer II. Here too, suitable polyester combinations are known to the person skilled in the art or can easily be determined by simple routine experiments, for example by means of pressed plates. It is frequently sufficient for the two polyesters to have at least one monomer unit in common or for corresponding monomer units to be at least similar. Ideally, the polyester should substantially correspond to the polyester of layer II.

Besides the graft copolymer and, where appropriate, the polyamide and/or the polyester, the adhesion promoter can also comprise further components as additives, such as, for example, an impact-modifying rubber and/or auxiliaries or added materials, as explained in greater detail above as possible constituents of layers I and II. The amount of all additives is, in total, a maximum of 40 parts by weight, preferably a maximum of 30 parts by weight and particularly preferably a maximum of 20 parts by weight.

The multilayer composite according to the invention is, in one embodiment, a pipe, a filler neck or a tank, in particular for the transport or storage of liquids or gases. A pipe of this type can have a straight or corrugated shape or may only be corrugated in sections. Corrugated pipes are known, for example those described in U.S. Pat. No. 5,460,771. Important applications for the multilayer composites according to the present invention are fuel lines, tank filler necks, vapor lines (i.e. lines in which fuel vapors are transported, for example vent lines), gasoline pump hoses and piping, cooling fluid lines, air-conditioning unit lines or fuel tanks.

The multilayer composite according to the invention can also be in the form of a flat composite, for example as a film, such as a packaging film for foods, as a composite element with a top layer having improved UV resistance, or as an extruded multilayer plate.

When the multilayer composite according to the invention is used for transporting or storing flammable liquids, gases or dusts, such as, for example, fuel or fuel vapors, it is advisable to provide one of the layers belonging to the composite or an additional inner layer with an electrically conductive finish. This can be carried out by compounding one or more of the layers with an electrically conductive additive by conventional methods. Examples of conductive additives which can be used are conductive carbon black, metal flakes, metal powder, metallized glass beads, metallized glass fibers, metal fibers (for example made from stainless steel), metallized whiskers, carbon fibers (also metallized), intrinsically conductive polymers or graphite fibrils. It is also possible to employ mixtures of different conductive additives. In the preferred case, the electrically conductive layer is in direct contact with the medium to be transported or stored and has a maximum surface resistance of $10^9$ Ω per square.

When the multilayer composite according to the invention is a pipe, it can also be sheathed with an additional elastomer layer. Both cross-linking rubber compositions and thermoplastic elastomers are suitable for the sheathing. The sheathing can be applied to the pipe either with or without an additional adhesion promoter, for example by means of extrusion via a crosshead die or by pushing a prefabricated elastomer tube over the already-extruded multilayer pipe.

The multilayer composite can be manufactured in one or more steps. For example one-step processes may include conventional multi-component injection molding methods, coextrusion methods or coextrusion blow molding methods. Multi-step processes, may include, for example, those described in U.S. Pat. No. 5,554,425.

The multilayer composite can consist, in the simplest embodiment, of the layer I, the adhesion promoter and the layer II. If additional layers are used, however, the following layer configurations, for example, may also be provided:

rubber/layer I/adhesion promoter/layer II;

layer I/adhesion promoter/layer II/electrically conductive layer II;

layer I/adhesion promoter/layer II/adhesion promoter/layer I;

layer I/adhesion promoter/layer II/adhesion promoter/electrically conductive layer I;

rubber/layer I/adhesion promoter/layer II/adhesion promoter/layer I/electrically conductive layer I; and layer II/adhesion promoter/layer I/electrically conductive layer I.

The results given in the examples were determined with the aid of the following measurement methods.

In order to determine the concentration of carboxyl end groups in the graft copolymer, 1 g of graft copolymer was dissolved in 50 ml of benzyl alcohol at 165° C. under a nitrogen blanket. The graft copolymer was dissolved for a maximum of 20 minutes. The solution was titrated with a solution of KOH in ethylene glycol (0.05 mol of KOH/l) using a phenolphthalein indicator, until the color change occurred.

In order to determine the concentration of amino groups in the graft copolymer, 1 g of the graft copolymer was dissolved in 50 ml of m-cresol at 25° C. The solution was titrated potentiometrically with perchloric acid.

The determination of the solution viscosity $\eta_{rel}$ (relative viscosity) was carried out using a 0.5% by weight solution of the graft copolymer in m-cresol at 25° C. in accordance with DIN 53727/ISO 307.

Having generally described this invention, a further understanding can be obtained by reference to certain specific examples which are provided herein for purposes of illustration only, and are not intended to be limiting unless otherwise specified.

EXAMPLES

The following components were used in the experiments:

Graft copolymer 1:

29.7 kg of laurolactam was melted at from 180° C. to 210° C. in a heating kettle and transferred into a pressure-tight polycondensation reactor; 1.5 kg of water and 1.71 g of hypophosphorous acid were subsequently added. The laurolactam cleavage was carried out at 280° C. at the inherent pressure generated within the reactor. The pressure within the reactor was then reduced to a residual steam pressure of 3 bar over the course of 3 hours, and 300 g of polyethyleneimine (LUPASOL G 100 from BASF AG, Ludwigshafen) was then metered into the reactor. The polyethyleneimine was reacted with the mixture at the inherent pressure generated within the reactor. The pressure in the reactor was subsequently reduced to atmospheric pressure, and nitrogen was then passed over the melt at 280° C. for 2 hours. The clear melt was discharged as an extrudate via a melt pump, cooled in a water bath and subsequently granulated. The graft copolymer 1 had the following properties:

$\eta_{rel}$: 1.68 Melting point $T_m$: 175° C. Amino group concentration: 225 mmol/kg Carboxyl end group concentration: <10 mmol/kg Graft copolymer 2:

9.5 kg of laurolactam was melted at from 180° C. to 210° C. in a heating kettle and transferred into a pressure-tight polycondensation reactor; 475 g of water and 0.54 g of hypophosphorous acid were subsequently added. The laurolactam cleavage was carried out at 280° C. at the inherent pressure generated inside the reactor. The reactor pressure was then reduced to a residual steam pressure of 5 bar over the course of 3 hours, and 500 g of polyethyleneimine (LUPASOL G 100 from BASF AG, Ludwigshafen) and 15 g of dodecanedioic acid were metered in. The two components were reacted at the inherent pressure generated inside the reactor. The reactor pressure was subsequently reduced to atmospheric pressure, and nitrogen was then passed over the melt at 280° C. for 2 hours. The clear melt was discharged as an extrudate via a melt pump, cooled in a water bath and subsequently granulated. The graft copolymer 2 had the following properties:

$\eta_{rel}$: 1.52 Melting point $T_m$: 169° C. Amino group concentration: 810 mmol/kg Carboxyl end group concentration: <10 mmol/kg PA 1: extrudable PA12 molding composition having $\eta_{rel}$=2.1 and an excess of carboxyl end groups.

PA 2: extrudable PA12 molding composition having $\eta_{rel}$=2.1 and an excess of amino end groups.

PES 1: VESTODUR 1000, a homopolybutylene terephthalate from Degussa-Hüls AG having a solution viscosity J measured in phenol/o-dichlorobenzene (1:1), of 107 $cm^3$/g.

PES 2: VESTODUR 3000, a homopolybutylene terephthalate from Degussa-Hüls AG having a solution viscosity J of 165 $cm^3$/g.

EXXELOR VA 1803: an EPM rubber functionalized with about 1% of maleic anhydride, from Exxon Chemical, Cologne Polyamide of layer I:
PA 3: Extrudable, plasticized, impact-modified PA 12 molding composition having ηhd rel=2.1 and an excess of carboxyl end groups
Polyester of layer II:
PES 3: VESTODUR 2000, a homopolybutylene terephthalate from Degussa-Hüls AG having a solution viscosity J of 145 cm³/g

Example 1

A pressed-plate three-layer composite was produced from PA 3 (layer I), graft copolymer 1 as adhesion promoter and PES 3 (layer II) at 250° C. and a pressing time of 30 seconds. Inseparable adhesion was obtained here both to the polyester layer and to the polyamide layer.

Example 2

As in Example 1, but with graft copolymer 2 as adhesion promoter. Here too, inseparable adhesion was obtained both to the polyester layer and to the polyamide layer.

Comparative Example 1

As in Example 1, a pressed-plate composite was produced from PA 3 (layer I) and PES 3 (layer II). Instead of the graft copolymer 1, LUPASOL G 100 in anhydrous form was applied in a very thin layer to the upper side of the PA 3 plate which was to be bonded to PES 3. After the pressing and cooling, the plate was removed, and the layer adhesion was tested. It was found that no adhesion was present.

Comparative Example 2

Four different blends of PA 2 and polyethyleneimine (LUPASOL G 100 in anhydrous form, from BASF AG, Ludwigshafen) were produced in accordance with Table 1 in a Haake laboratory compounder.

TABLE 1

Blends of polyamide and polyethyleneimine

| Blend component | Parts by weight | | | |
|---|---|---|---|---|
| PA 2 | 99 | 95 | 90 | 80 |
| Polyethyleneimine | 1 | 5 | 10 | 20 |

The mixing was carried out at 180° C. and 64 rpm over the course of 8 minutes.

The mixtures were subsequently comminuted and applied to an injection-molded plate of PES 1 which was in a press mold and subsequently pressed as indicated in Example 1.

In all four cases, it was found on checking the layer adhesion that the composite was poorly bonded, and could be separated at the interface even by hand.

Adhesion Promoter blends:
AP 1 (not according to the invention):
12.6 kg of PA 1 and 22.82 kg of PES 1 were mixed as melts, extruded and granulated in a Berstorff ZE 25 33D twin-screw compounder at 270° C. and 200 rpm and with a throughput of 10 kg/h.
AP 2 (according to the invention):
12.6 kg of PA 2, 22.82 kg of PES 1 and 5.0 kg of graft copolymer 2 were mixed as melts, extruded and granulated in a Berstorff ZE 25 33D twin-screw compounder at 270° C. and 150 rpm and with a throughput of 10 kg/h.
AP 3 (according to the invention):
12.6 kg of PA 2, 22.82 kg of PES 2 and 5.0 kg of graft copolymer 2 were mixed as melts, extruded and granulated in a Berstorff ZE 25 33D twin-screw compounder at 270° C. and 150 rpm and with a throughput of 10 kg/h.
AP 4 (according to the invention):
As in AP 3, but with additional use of 4.0 kg of EXXELOR VA 1803.

Comparative Example 3 and Examples 3 to 5

In order to produce the multilayer composites, a tape coextrusion mold having an exit width of 30 mm was used, with the various layers being brought together in the mold just before the exit of the melt from the mold. The mold was fed by three Storck 25 extruders. After exiting the mold, the three-layer composite was laid onto a chill roll and taken off (chill roll process).

The results are shown in the table below; the adhesion scores indicated therein have the following meanings:
0 no adhesion
1 slight adhesion
2 some adhesion; can be separated with little effort
3 good adhesion; can only be separated with great effort and possibly with the aid of tools
4 cannot be separated

| Example (E) or Comparative Example (C) | Layer I | Adhesion promoter | Layer II | Adhesion Layer I/ adhesion promoter interface | Layer II/ adhesion promoter interface |
|---|---|---|---|---|---|
| C 3 | PA 3 | AP 1 | PES 1 | 0 | 4 |
| E 3 | PA 3 | AP 2 | PES 1 | 4 | 4 |
| E 4 | PA 3 | AP 3 | PES 3 | 4 | 4 |
| E 5 | PA 3 | AP 4 | PES 1 | 4 | 4 |

Examples 4 and 5 according to the invention were additionally repeated in modified form by producing three-layer pipes with the corresponding layer configuration (with PA 3 as the outer layer). The results are identical: in all cases an adhesion score of 4 was obtained.

In all the cases investigated, the long-term resistance of the multilayer composites in contact with alcohol-containing fuel was excellent both at 40° C. and at 60° C.

The priority document of the present application, German patent application 19929883.1 filed Jun. 29, 1999 and German patent application 10005641.5, filed Feb. 9, 2000, are incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed as new and is intended to be secured by Letters Patent is:

1. A thermoplastic multilayer composite which comprises:
  I) at least one layer I of a thermoplastic molding composition;
  II) at least one layer II of a further thermoplastic molding composition; and at least one layer of an adhesion promoter disposed between at least one layer I and at least one layer II, wherein said adhesion promoter comprises at least 5% by weight of a graft copolymer comprising the following monomers:
    a) from 0.5 to 25% by weight, based on the total amount of graft copolymer, of a polyamine having at least 4 nitrogen atoms and having a number average molecular weight $M_n$ of at least 146 g/mol, and b) polyamide-forming monomers selected from the group consisting of lactams, ω-aminocarboxylic acids, equimolar mixtures of diamines and dicarboxylic acids, and mixtures thereof.

2. The thermoplastic multilayer composite of claim 1, wherein at least one of layer I or layer II comprises a polyamide molding composition or a polyester molding composition.

3. The thermoplastic multilayer composite of claim 1, wherein layer I comprises a polyamide molding composition and layer II comprises a polyester molding composition.

4. The thermoplastic multilayer composite of claim 1, wherein the polyamine contains at least 8 nitrogen atoms.

5. The thermoplastic multilayer composite of claim 1, wherein the polyamine contains at least 11 nitrogen atoms.

6. The thermoplastic multilayer composite of claim 1, wherein the polyamine has a number average molecular weight $M_n$ of at least 500 g/mol.

7. The thermoplastic multilayer composite of claim 1, wherein the polyamine has a number average molecular weight $M_n$ of at least 800 g/mol.

8. The thermoplastic multilayer composite of claim 1, wherein the graft copolymer has an amino group concentration in the range of from 100 to 2500 mmol/kg.

9. The thermoplastic multilayer composite of claim 1, wherein the graft copolymer further comprises:
   c) an oligocarboxylic acid, selected from the group consisting of a dicarboxylic acid and a tricarboxylic acid.

10. The thermoplastic multilayer composite of claim 9, wherein the amount of dicarboxylic acid is 0.015 to 3 mol %, and the amount of tricarboxylic acid is 0.01 to 1.2 mol % based on the total moles of polyamide-forming monomers.

11. The thermoplastic multilayer composite of claim 1, wherein the adhesion promoter further comprises at least one polymer selected from the group consisting of a polyamide and polyester.

12. The thermoplastic multilayer composite of claim 2, wherein the adhesion promoter further comprises at least one polymer selected from the group consisting of a polyamide and polyester.

13. The thermoplastic multilayer composite of claim 3, wherein the adhesion promoter further comprises at least one polymer selected from the group consisting of a polyamide and polyester.

14. The multilayer composite of claim 1, which comprises one layer I and one layer II.

15. The multilayer composite of claim 1, wherein at least one layer of said multilayer composite has been rendered electrically conductive.

16. A hollow article comprising the multilayer composite of claim 1.

17. The hollow article of claim 16, wherein said hollow article is a pipe.

18. The hollow article of claim 17, which is fully corrugated or partially corrugated.

19. The hollow article of claim 17 having an interior and an exterior surface, wherein the interior surface layer has been rendered electrically conductive.

20. The hollow article of claim 17 having an interior and an exterior surface, wherein the exterior surface layer is comprised of rubber.

21. The hollow article of claim 17, wherein said pipe is a fuel line, a brake fluid line, a cooling fluid line, a hydraulic fluid line, a gas station line, an air conditioning unit line or a vapor line.

22. The hollow article of claim 16, wherein said hollow article is a tank, a fuel tank, a filler neck, or a fuel tank filler neck.

23. A plate comprising the multilayer composite of claim 1.

24. The multilayer composite of claim 1, made by multi-component injection molding, coextrusion or coextrusion blow molding.

25. The hollow article of claim 16, made by multi-component injection molding, coextrusion or coextrusion blow molding.

26. The plate of claim 22, made by multi-component injection molding, coextrusion or coextrusion blow molding.

27. An adhesion promoter comprising at least 5% by weight of a graft copolymer comprising the following monomers:
   a) from 0.5 to 25% by weight, based on the total amount of graft copolymer, of a polyamine having at least 4 nitrogen atoms and having a number average molecular weight $M_n$ of at least 146 g/mol, and
   b) polyamide-forming monomers selected from the group consisting of lactams, ω-aminocarboxylic acids, equimolar mixtures of diamines and dicarboxylic acids, and mixtures thereof.

28. An adhesion promoter comprising:
   I) from 5 to 60 parts by weight of a graft copolymer comprised of the following monomers:
      a) from 0.5 to 25% by weight, based on the total amount graft copolymer, of a polyamine having at least 4 nitrogen atoms and having a number average molecular weight $M_n$ of at least 146 g/mol, and
      b) polyamide-forming monomers selected from the group consisting of lactams, ω-aminocarboxylic acids, equimolar mixtures of diamines and dicarboxylic acids, and mixtures thereof,
   II) from 10 to 85 parts by weight of a polyamide;
   III) from 10 to 85 parts by weight of a polyester;
   wherein the sum of the parts by weight of I, II, and III is 100;
   IV) a maximum of 40 parts by weight of additives comprising at least one additive selected from the group consisting of impact-modifying rubber, flame retardants, stabilizers, plasticizers, fillers, reinforcing fibers, and processing auxiliaries.

29. A method of adhering at least two layers of a thermoplastic multilayer composite using the adhesion promoter of claim 27.

30. A method of adhering at least one polyamide to at least one polyester using the adhesion promoter of claim 27.

31. A method of adhering at least one polyamide to at least one polyester using the adhesion promoter of claim 28.

* * * * *